July 6, 1965 H. L. BARNEY 3,193,626

DUPLICATE-RECORD INDEXING SYSTEM

Filed Dec. 29, 1944

INVENTOR
H. L. BARNEY
BY W. C. Parnell
ATTORNEY

United States Patent Office 3,193,626
Patented July 6, 1965

3,193,626

DUPLICATE-RECORD INDEXING SYSTEM

Harold L. Barney, Madison, N.J., assignor to Bell Telephone Laboratories, Incorporated, New York, N.Y., a corporation of New York Filed Dec. 29, 1944, Ser. No. 570,429
3 Claims. (Cl. 179—100.4)

This invention relates to sound recording and particularly to the recording of duplicate records.

As is well known, the usual method of making multiple recordings of the same sound involves making a single original recording and deriving from this by well known techniques one or more stampers which may be used to make any required number of identical record pressings for reproduction. While this procedure is quite satisfactory for ordinary commercial recordings, duplicate recordings are sometimes used for special purposes where the ultimate demand for any given recording is but one duplicate pair.

For example, in communication systems where a very high degree of secrecy is required, the messages may be made unintelligible for transmission by the use at the transmitting station of a key record the reproduction of which during the transmission effects certain changes in the nature of the currents transmitted. The reconversion of the received signal to intelligible speech requires the use at the receiving station of an exact duplicate record which will perform on each element of the signal an operation which is exactly complementary to the operation performed on the same element of the signal at the transmitting station.

This precision requirement naturally suggests the use of duplicate pressings which meet this requirement automatically but for the highest degree of secrecy a pair of key records are used only once so that the cost per record made by ordinary processing is very high. Processing also requires considerable time and it has the further disadvantage that the records must be handled by a large number of people thereby increasing the risk of loss of secrecy.

When duplicate original recordings are used in a system of the type referred to above they must be very accurately indexed so that the key may be introduced at both ends of the transmission path in exactly the same phase relation with respect to the signal. Even with a great deal of care it has been found difficult to index these records with sufficient accuracy by ordinary methods.

The object of this invention is to index such records automatically and with a very high degree of accuracy.

According to the invention the marks are made in the records by the recorders which are used for recording the keying signals. In the preferred system the records are cut on two synchronously operated turntables and the index marks are made by transmitting a sharply peaked pulse to both recorders once per turntable revolution. A small section of each record near the periphery is reserved for this purpose and in these otherwise blank grooves the recorded pulses appear on each record as a sharply defined radial line which is easily identified and when the records are to be reproduced this line may be accurately aligned with a corresponding mark on the reproducing machine.

Figure 1:
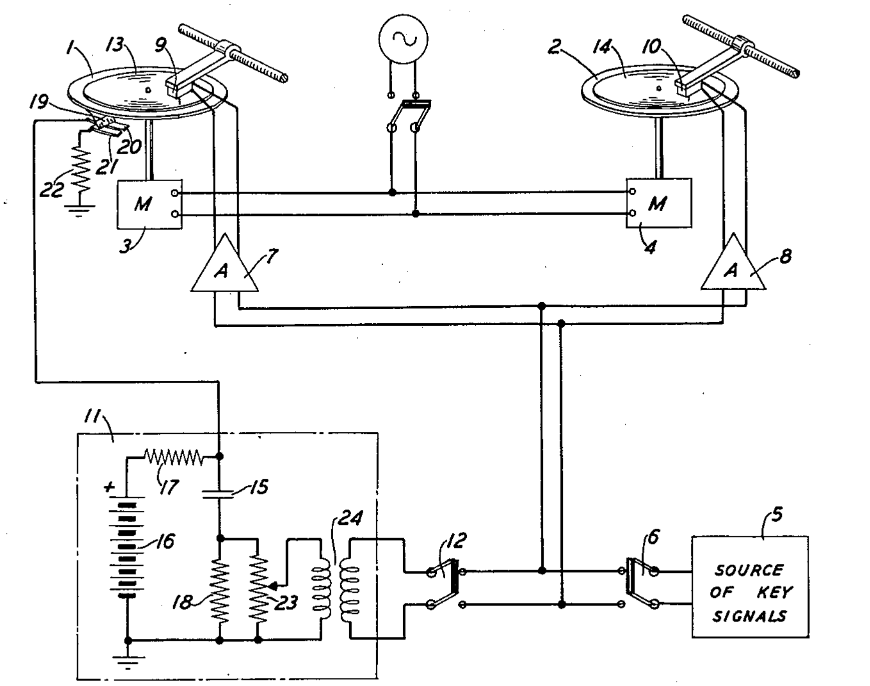

In the drawing, FIG. 1 is an indexing system according to the invention; and

Figure 2:
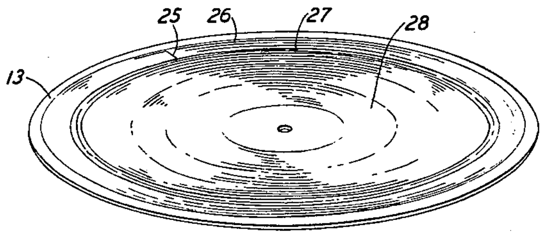

FIG. 2 is a record showing the indexing mark.

The turntables 1 and 2 are synchronously driven in any suitable manner as, for example, by individual synchronous motors 3 and 4. The key signal material from the source 5 is transmitted through switching mechanism 6 and the amplifiers 7 and 8 to the recorders 9 and 10 and the indexing pulses from the pulse generator 11 are transmitted to the same circuit through switching mechanism 12. It will be understood that in practice the recorders are transversed automatically, that the switching mechanisms 6 and 12 are parts of a somewhat complex relay system and that the system involves many other features not shown since they form no part of the present invention.

When the recorders are in their indexing positions, usually near the outer peripheries of the record disks 13 and 14, the key signal circuit is opened at switch 6 and the indexing circuit is closed at switch 12. In the pulse generator 11 the condenser 15, which is of about .2 microfarad capacity is charged to a potential of about 250 volts by a grounded battery 16 over a circuit including a very high resistor 17 (about .5 megohm) and a low resistor 18 (about 200 ohms). Once per revolution of the turntable 1 the condenser is suddenly discharged to ground through the resistor 22 when brush 19 on the turntable bridges the stationary segments 20 and 21. The discharge current produces a momentary, large potential drop across the resistor 18 and an adjustable proportion of this potential is obtained as required by means of the potentiometer 23 and impressed on the recording circuit through the transformer 24.

In the system shown the recorders 9 and 10 are of the hill and dale type as disclosed, for example, in Patent 2,161,489 to Vieth-Wiebusch-Yenzer, June 6, 1939, and they are similarly poled so that each recorder stylus is driven downwardly by the indexing pulse to cut a deep "dale" in the record. The invention, is course, equally applicable to lateral type recording systems and when lateral recorders are used they also should be similarly poled to produce identical marks on both records.

As the brush 19 moves away from the segments 20, 21 and opens the discharge path, the condenser 15 is recharged by the battery 16 by the time the brush returns to the bridging position. The successive dales cut in this manner will, of course, lie on a radius of the record and when the indexing operation is continued for a number of revolutions they will appear in the record as sharply defined fine line 25 as shown in FIG. 2. The grooves 26 in which the index marks occur are preferably located at the outside of the record for greater accuracy in positioning the record on the reproducing turntable and separated by a few blank grooves 27 from the signal grooves 28 in the central portion of the disk.

By using the recorders themselves to make the indexing marks in the manner described, the marks are automatically placed in exactly the same relative position with respect to the start of the recorded signal in both records. Hence, in making the records no phasing of the turntables is required and in using the records it is necessary only to place each record on its reproducing turntable with the index mark properly aligned with the corresponding mark on the turntable.

What is claimed is:

1. In a system for making duplicate recordings, the combination with two record members revolving at the same speed, recorders cooperating with the record members and a source of current to be recorded adapted to be connected to both recorders, of means for indexing the recordings comprising a source of indexing pulses, and a circuit including contacts operated once per revolution of the record members for connecting the pulse source to both recorders.

2. In a system for making duplicate recordings, the combination with two record members revolving at the same speed, recorders cooperating with the record members and a source of current to be recorded adapted to be connected to both recorders, of a pulse generator, switching means for connecting the pulse generator to the recorders and contacts operated once per revolution of one of the record members for timing the generation of the pulses to produce readily visible, radially aligned indexing undulations in each of the record members.

3. A system according to claim 2 in which the pulse generator comprises a condenser, a source of charging potential, a high impedance circuit connecting the source to the condenser, and a low impedance discharge circuit for the condenser extending through the timing contacts.

References Cited by the Examiner

FOREIGN PATENTS 329,677 of 1930 Great Britain.

IRVING L. SRAGOW, *Primary Examiner.*

CHARLES J. SPENCER, NEWTON N. LOVEWELL, NORMAN H. EVANS, *Examiners.*